(No Model.)

S. STRAKER.
LUBRICATING BEARING.

No. 525,294. Patented Aug. 28, 1894.

Witnesses.
G. T. Redfern
John E. Bousfield.

Inventor:
Sidney Straker

UNITED STATES PATENT OFFICE.

SIDNEY STRAKER, OF LONDON, ENGLAND.

LUBRICATING BEARING.

SPECIFICATION forming part of Letters Patent No. 525,294, dated August 28, 1894.

Application filed November 2, 1893. Serial No. 489,837. (No model.)

*To all whom it may concern:*

Be it known that I, SIDNEY STRAKER, a subject of the Queen of Great Britain, residing at London, England, have invented new and useful Improvements in Lubricating Bearings, of which the following is a specification.

My invention relates to bearings for journals and has for its object to provide improved means for maintaining the continuous lubrication of the same, and the filtering of the lubricant during the working.

In carrying out my invention I apply to a machine-pedestal or bearing block, adjacent to the two sides of the bearing, oil cups or catchers, which are connected at their lower parts so that the oil may flow from one to the other, and upon the cap or cover of the block I form an oil box in the bottom of which is a strainer of wire gauze or other suitable material, the said chamber being normally closed by a lid. Upon the shaft working in the bearing I fix a disk or wheel rotating in one of the said oil catchers in such a manner that it will lift the oil and throw it by centrifugal action onto a lip or partition whence it will flow into the oil box hereinbefore referred to and thence onto the bearing.

To enable my invention to be fully understood I will describe the same by reference to the accompanying drawings, in which—

Figure 1:
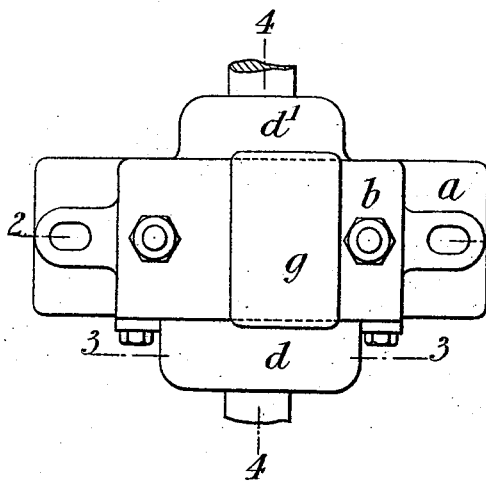
Figure 2:
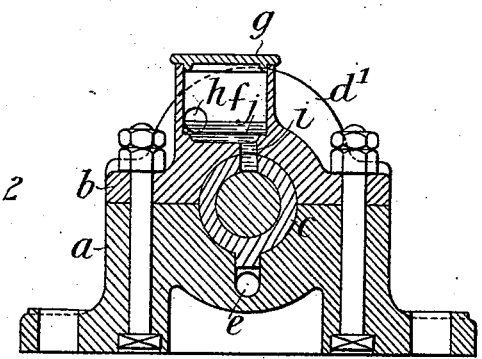
Figure 3:
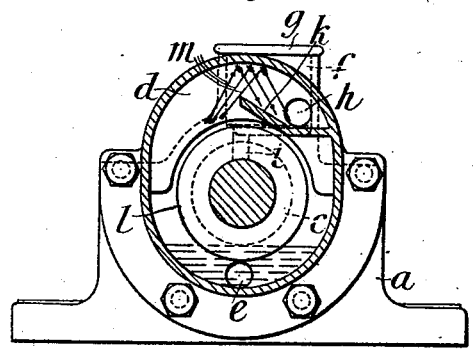
Figure 4:
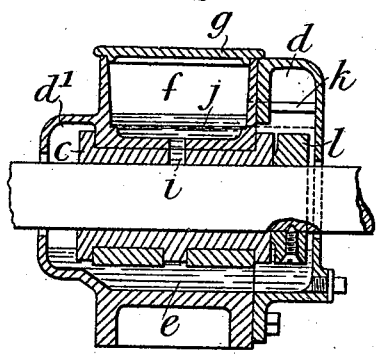
Figure 5:
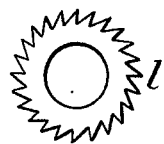
Figure 6:
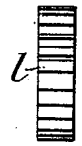

Figure 1 is a plan of a plumber block having my improvements applied thereto; and, Figs. 2, 3 and 4 are sections on the lines 2—2, 3—3 and 4—4 respectively of Fig. 1. Figs. 5 and 6 are elevations at right angles to each other of a wheel which I sometimes employ for lifting the oil.

$a$ is the base of the pedestal or block, $b$ is the cap or cover thereof, and $c$, is the bush or brass forming the bearing to be lubricated, all of which parts are of ordinary construction.

$d$, $d'$ are the oil catchers upon the sides of the block and cover and inclosing the ends of the brasses or bearing; these oil catchers may be formed separately from the block and attached thereto, or may be cast in one piece therewith. As shown in the drawings the catcher $d$ is represented as being attached to the block by screws, while the catcher $d'$ is represented as being cast with the block.

$e$ is the passage formed through the block and serving to connect the two catchers $d$, $d'$, $f$ is the oil box formed upon the cap $b$, and $g$ is the lid of the same. The said oil box communicates with the upper part of the catcher $d$ through the passage $h$ and with the bearing to be lubricated through the passage $i$, the strainer $j$ being placed between the passages $h$, $i$ so that the oil which flows through the passage $h$ is filtered before it passes to the bearing.

$k$ is the lip or partition formed across the upper part of the catcher $d$ and $l$ is the disk or wheel which when the shaft is rotating lifts the oil and throws it off by centrifugal action in the direction of the arrows $m$, Fig. 3, so that they will fall on to the said partition and thence flow into the chamber $f$, whence, after passing through the strainer $j$, the lubricant flows into the bearing and thence gradually works through into the catchers $d$, $d'$ to be again raised.

The disk $l$ is represented in Figs. 3 and 4 as plain, it may, however, be serrated upon its edges as shown in Figs. 5 and 6, to constitute a kind of bucket wheel so as to facilitate the lifting of the oil.

Having now particularly described and ascertained the nature of my said invention and in what manner the same is to be performed, I declare that what I claim is—

In a lubricating bearing, an oil reservoir above the shaft to be lubricated, having a passage leading from said reservoir to the shaft, a screen across the upper end of said passage, compartments at each end of said bearing for catching the drippings from the said shaft, and a serrated disk journaled upon said shaft arranged in one compartment, a receiving chamber formed by an inclined partition adapted to catch the oil thrown by said disk and a passage leading from the receiving chamber to the oil reservoir, substantially as described.

SIDNEY STRAKER.

Witnesses:
  G. F. REDFERN,
  JOHN E. BOUSFIELD,
*Of the firm of G. F. Redfern & Co., 4 South Street, Finsbury, London, Patent Agents.*